United States Patent
Lee

(10) Patent No.: US 6,599,661 B1
(45) Date of Patent: Jul. 29, 2003

(54) ELECTROLYTE COMPOSITION OF LEAD STORAGE BATTERY

(75) Inventor: Kang-Soo Lee, Inchon (KR)

(73) Assignee: Solteko, Inc. (KR)

( * ) Notice: Subject to any disclaimer, the term of this patent is extended or adjusted under 35 U.S.C. 154(b) by 0 days.

(21) Appl. No.: 09/857,950

(22) PCT Filed: Sep. 6, 2000

(86) PCT No.: PCT/KR00/01015

§ 371 (c)(1),
(2), (4) Date: Sep. 24, 2001

(87) PCT Pub. No.: WO01/28026

PCT Pub. Date: Apr. 19, 2001

(30) Foreign Application Priority Data

Oct. 13, 1999 (KR) .............................. 99-44276

(51) Int. Cl.$^7$ ................................. H01M 6/04
(52) U.S. Cl. ................ 429/205; 429/206; 429/207; 429/325; 252/62.2
(58) Field of Search .................. 429/205, 206, 429/207, 325; 252/62.2

(56) References Cited

U.S. PATENT DOCUMENTS 4,543,166 A * 9/1985 Lash .......................... 205/246

* cited by examiner

*Primary Examiner*—Laura Weiner
(74) *Attorney, Agent, or Firm*—Kenneth E. Horton; Rader, Fishman & Grauer PLLC

(57) ABSTRACT

The present invention relates to an electrolyte composition for a lead storage battery, which can maintain the performance of a storage battery at low temperature by enhancing the performance and life of a storage battery. It can also be fully charged in a short period of time due to a greater current efficiency. The present invention can extend the life of a storage battery due to its effect of removing white-colored lead sulfate without corrosion at the electrode plates, and may lead to recycling of waste storage batteries ruined by white-colored lead sulfate.

1 Claim, 7 Drawing Sheets

Fig. 3
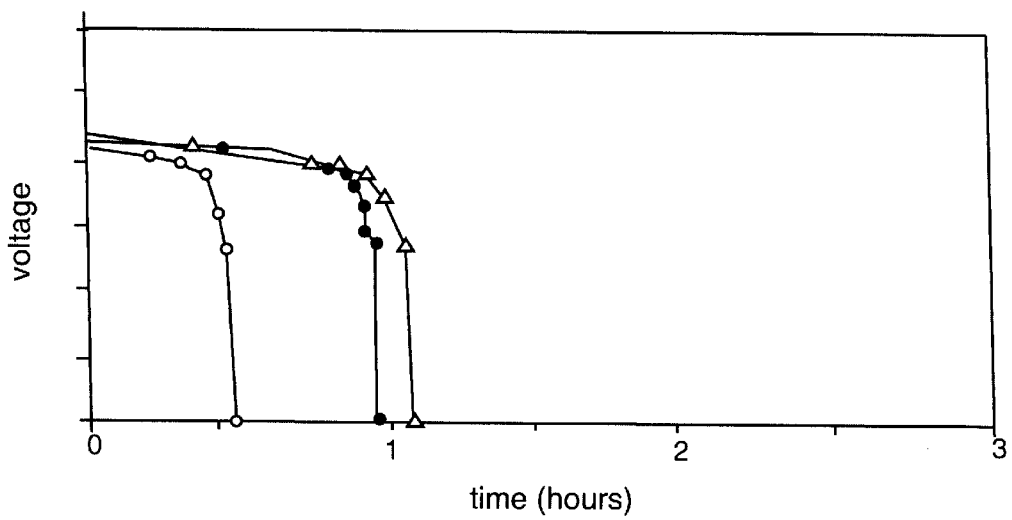
(a)
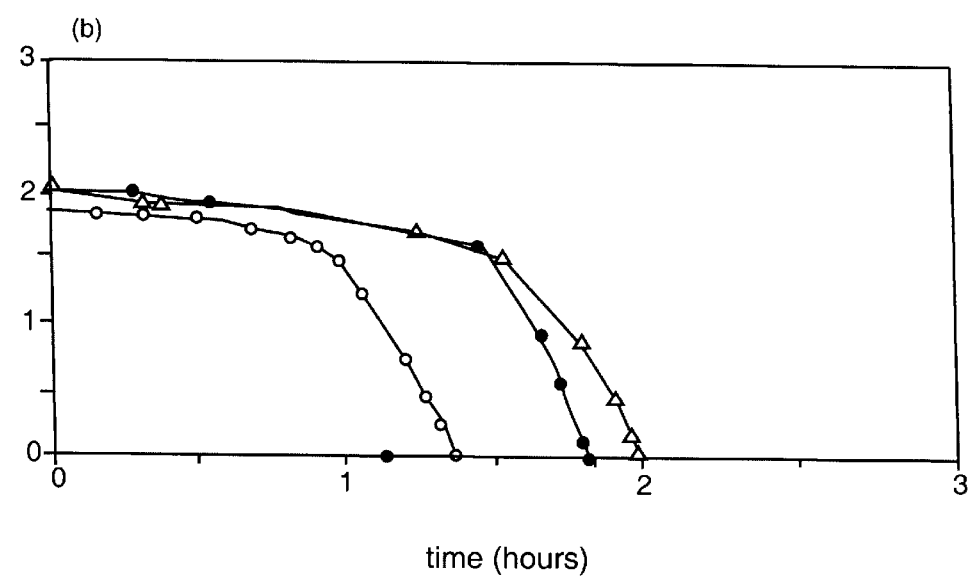
(b)

ELECTROLYTE COMPOSITION OF LEAD STORAGE BATTERY

TECHNICAL FIELD

The present invention relates to an electrolyte composition for a lead storage battery, which can maintain the performance of a storage battery at low temperature by enhancing the performance and life of a storage battery. It can also be fully charged in a short period of time due to a greater current efficiency. The present invention can extend the life of a storage battery due to its effect of removing white-colored lead sulfate without corrosion at the electrode plates, and may lead to recycling of waste storage batteries ruined by white-colored lead sulfate.

BACKGROUND ART

A lead storage battery is a storage battery with the longest history. With the changing times, there have been many improvements on the lead storage batteries, and they are being widely used, such as for automobiles, emergency power supplies, and standardization of electric storage. Currently, lead storage batteries approximately take up a 90% share of the total production market of secondary batteries.

A lead storage battery comprises an anode plate ($PbO_2$), a cathode plate (Pb), and electrolyte. By means of electric discharge, the two electrodes both change into lead sulfate ($PbSO_4$). Lead peroxide ($PbO_2$) at the anode plate is made by electrolytic oxidation of lead or lead oxides. This type of active material is porous and has a large applicable area, which can be easily reacted. At the same time, although it is necessary to prevent a collapse or dropout due to the expansion and contraction of volume by way of charge and discharge, the lead sulfate produced during a discharge deteriorates the performance of active materials at the anode plate, which in turn is the main cause of aging of storage batteries.

In order to solve the aforementioned problems, research for aging suppression has been carried out by means of using improved synthetic materials as active materials at the electrodes. Although there is a method of enhancing aging suppression by improving the characteristics of electrolytes, research into this aspect is rather inadequate.

Korean Patent Publication No. 83-1674 discloses a method of preparing an electrolyte composition, which comprises reducing the amount of sulfuric acid in a lead storage battery and adding magnesium sulfate, aluminum sulfate and ammonium fluoborate thereto. However, it is a mere enhancement by solving the problems of conventional sulfuric-acid electrolytes, and therefore is not currently in practical use. Korean Patent Publication No. 98-127040 discloses an electrolyte composition, which is made by adding compounds such as caustic soda to sulfuric-acid electrolyte. Yet, the actual working of the invention is rather questionable due to the neutralization reaction of caustic soda with sulfuric acid (i.e., the main ingredient).

DISCLOSURE OF INVENTION

The objective of the present invention lies in solving the problems as above, or providing an electrolyte composition for a lead storage battery, which enhances the performance and life of a storage battery by excluding sulfuric acid from the conventional sulfuric-acid electrolyte.

The electrolyte composition for a lead storage battery of the present invention comprises 0.5~1.7 wt % of cobalt sulfate ($CoSO_4$), 40~50 wt % of magnesium sulfate ($MgSO_4$), 0.2~0.8 wt % of ammonium chloride ($NH_4Cl$), 15–25 wt % of aluminum chloride ($AlCl_3$), and 0.05~1.0 wt % of nicotinic acid to 100 parts of distilled water. As for the methods of mixing these compounds, generally known methods in the art can be used.

As for the electrolyte composition of the present invention, the upper limits on the amounts of respective components are set in such a way to achieve maximum current efficiency while the lower limits thereof are limitations for achieving performance efficiency for the electrolyte composition.

A conventional lead storage battery may undergo a drop in performance or explosion during rapid charging. However, a storage battery using the electrolyte composition of the present invention can be fully charged in a short period of time due to a greater current efficiency. The present invention has the effect of removing white-colored lead sulfate ($PbSO_4$) without corrosion at the electrode plates. In other words, it can prevent the occurrence of white-colored lead sulfate, which is one of the major causes for shortening the life of a storage battery. Consequently, the present invention leads to the extension of life of a storage battery and recycling of waste storage batteries ruined by white-colored lead sulfate.

Moreover, the specific gravity of the electrolyte composition of the present invention is 1.15~1.17, which is lower than that of the conventional sulfuric-acid electrolyte (approximately 1.28). In the case of a storage battery using the electrolyte composition of the present invention weight reduction for a battery may also be possible.

Further, the present invention can be used as a storage battery for electric cars, which can solve the current problems thereof with respect to the life, efficiency, and rapid charging. The present invention can be understood in a more specific manner by means of the embodiments and experimental examples as below. Nonetheless, the embodiments as below are for illustrative purposes only and therefore should not be deemed to limit the scope of protection of the present invention.

BRIEF DESCRIPTION OF DRAWINGS

FIG. 3 is a graph, which illustrates the effects of discharge according to the changes in temperature of electrolytes of the present invention and conventional sulfuric acid.

BEST MODE FOR CARRYING OUT THE INVENTION

Preparation of electrolyte composition

The electrolyte composition of the present invention was prepared by adding 1.0 wt % of cobalt sulfate, 50 wt % of magnesium sulfate, 0.3 wt % of ammonium chloride, 20 wt % of aluminum chloride, and 0.07 wt % of nicotinic acid to 100 parts of distilled water

EXAMPLE 1

Figure 1:
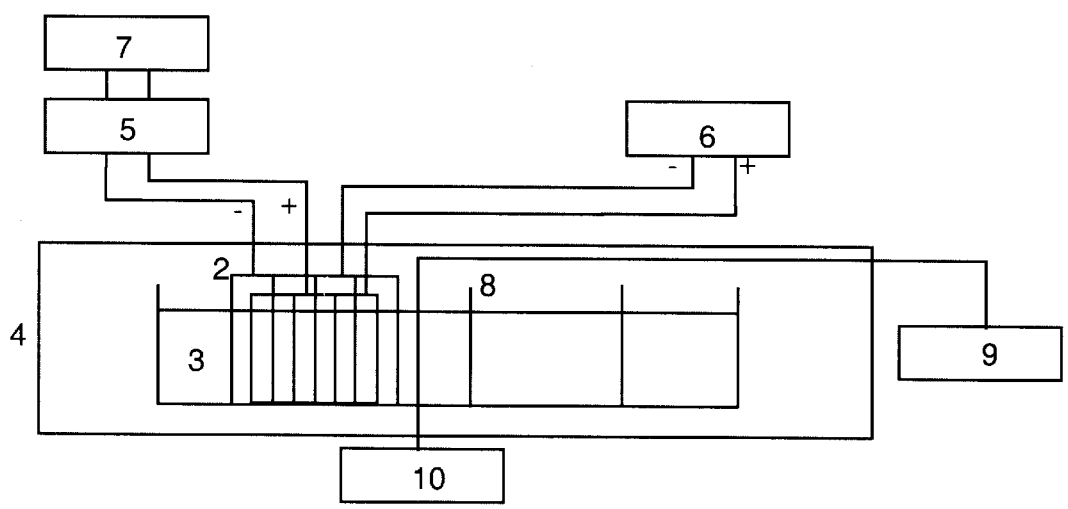
FIG. 1 is an outline diagram for an experimental device for charging and discharging.

The charge and discharge characteristics were measured by using the aforementioned electrolyte composition and conventional sulfuric-acid electrolyte (33.3 wt % of sulfuric acid). The experimental device used in the present invention for charging and discharging is shown in FIG. 1. To the unit cell (voltage 4 V, current 2 A) comprising 4 anode plates (2) and 5 cathode plates (1), the electrolytes of the present invention and those of sulfuric acid were respectively poured therein. The charge and discharge characteristics were measured by Potentiostat/Galvanostat 5 (MRV-350A, IMACE Co.), which was connected to a wire extending from the unit cell. At that time, voltage was adjusted by using a storage-battery tester 6. Then, while maintaining the temperature of electrolytes, the discharge characteristics were measured according to the changes in current and temperature. A temperature control room 4, a computer 7, a thermoelectric couple 8, a temperature regulator 9, and a testing device for coolant of a storage density 10, which are generally used in the art, can be employed in the present example. The numbers of units of anode and cathode plates for the embodiment herein can be changed according to the circumstances.

Further, the following factors were measured: the changes in specific gravities of electrolytes of the present invention and those of sulfuric acids at the time of charge and discharge, and a drop in performance of a lead storage battery by continuous discharge and discharge. The results are shown in FIGS. 2, 3, 4, 5 and 6.

Figure 2:
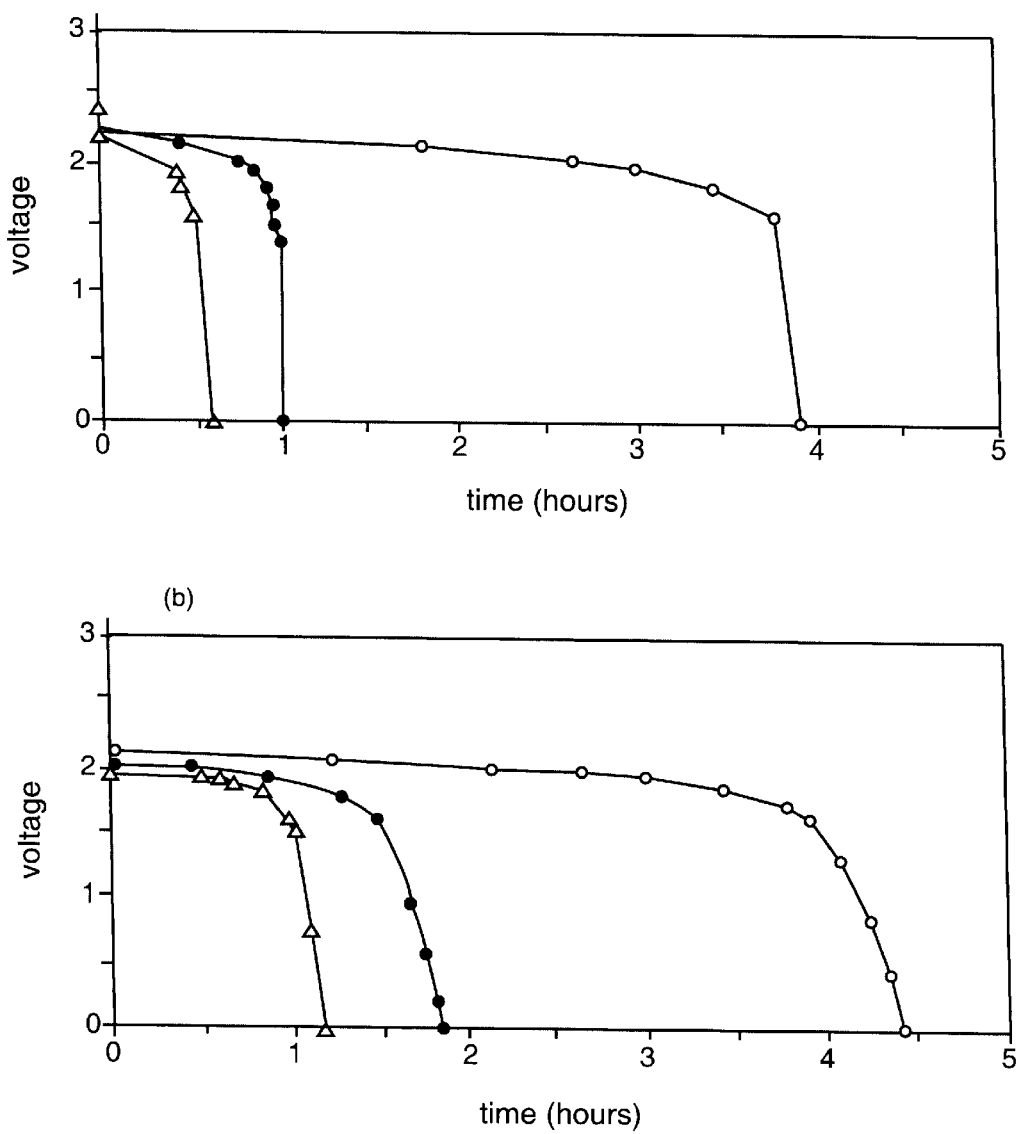
FIG. 2 is a graph, which illustrates the effects of discharge according to the changes in current of electrolytes of the present invention and conventional sulfuric acid.

As shown in FIG. 2, the electrolyte (b) of the present invention showed higher capacity of discharge than the sulfuric-acid electrolyte (a). As shown in FIG. 3, with the increase in temperature, the electrolyte (b) of the present invention showed higher discharge efficiency as compared to the sulfuric-acid electrolyte (a). In particular, there was a large difference of capacity of discharge at 0° C. As such, the electrolyte of the present invention was shown to have excellent discharge efficiency at low temperature.

Figure 4:
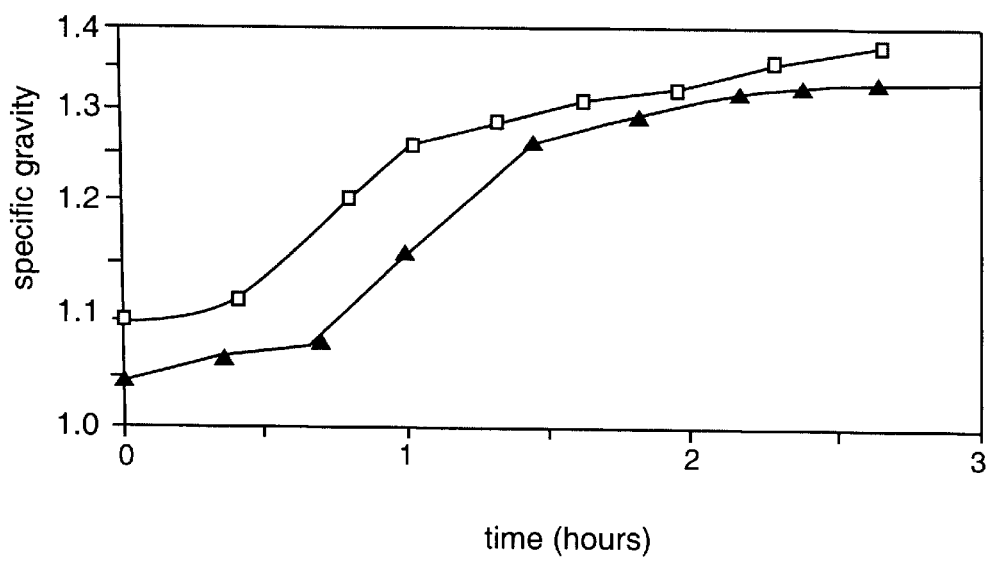
FIG. 4 is a graph, which compares the specific gravities of electrolytes of the present invention and conventional sulfuric acid while charging.
Figure 5:
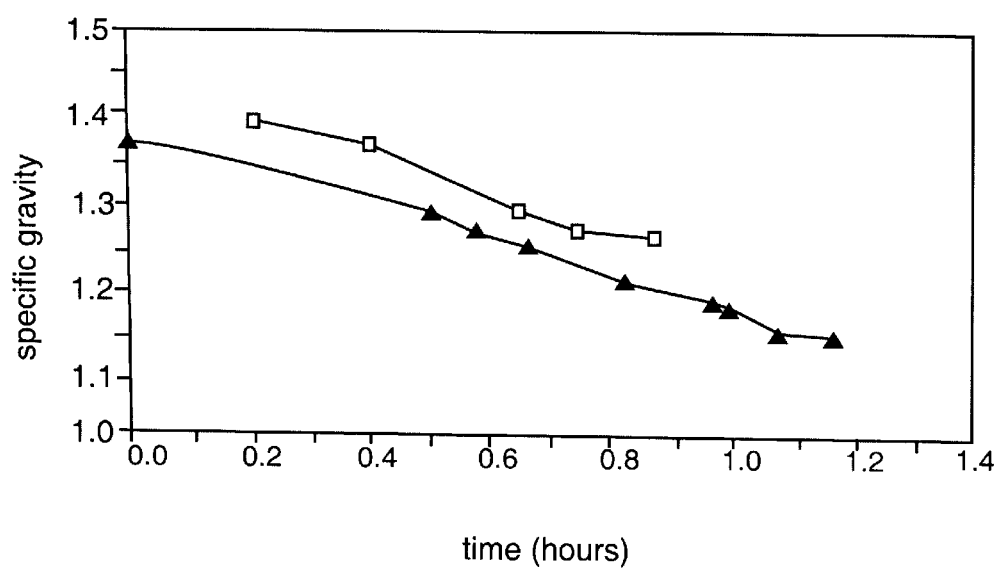
FIG. 5 is a graph, which compares the specific gravities of electrolytes of the present invention and those of the conventional sulfuric acid while discharging.
Figure 6:
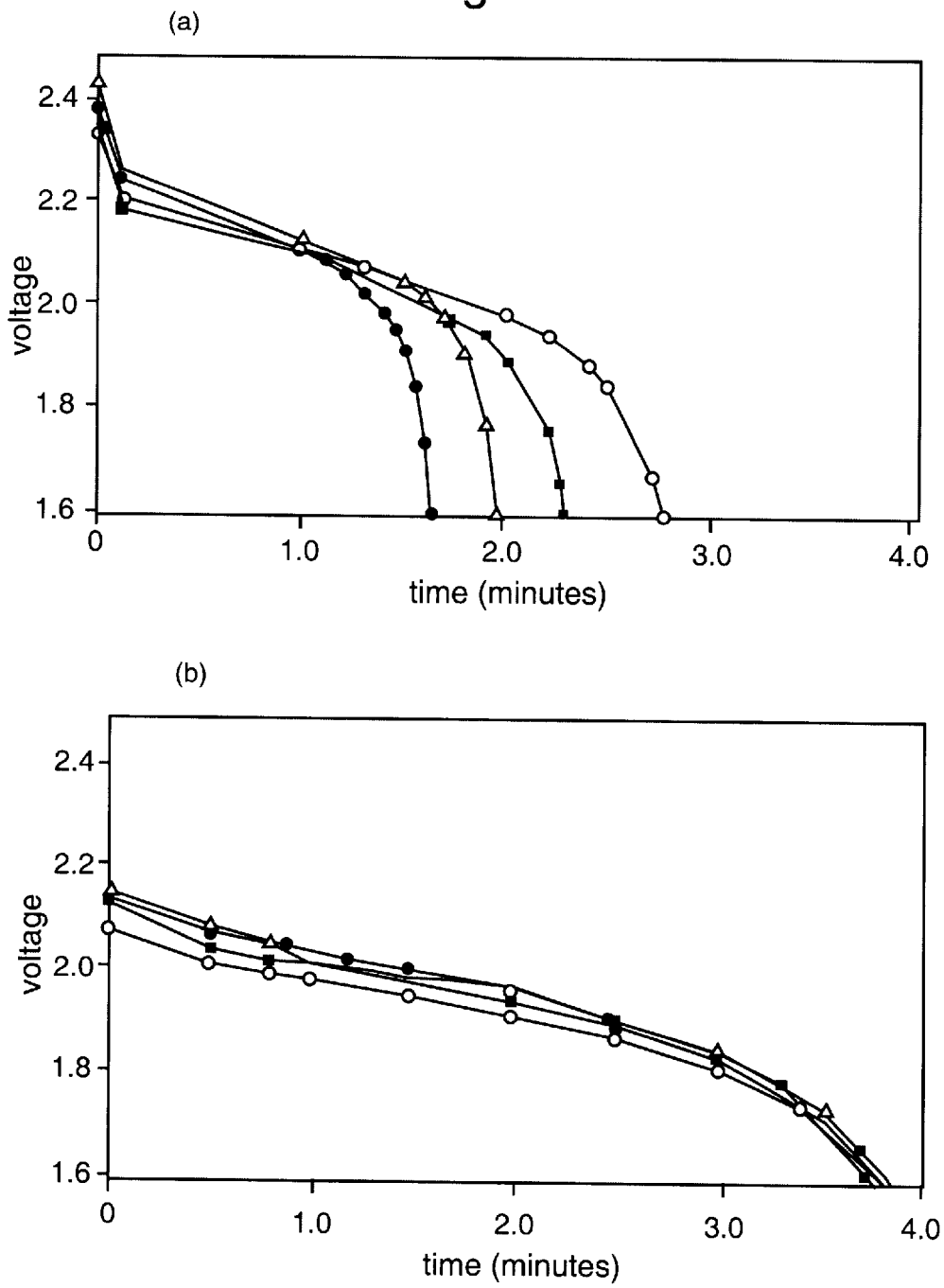
FIG. 6 is a graph, which illustrates the effects of discharge of electrolytes of the present invention and conventional sulfuric acid during continuous charging and discharging.

As shown in FIG. 4, as compared to the electrolyte of the present invention, the sulfuric-acid electrolyte showed a steeper ascending curve at the time of a charge at a higher specific gravity. As shown in FIG. 5, as compared to the electrolyte of the present invention, the sulfuric-acid electrolyte started to fall at the time of a discharge at a higher specific gravity, and the terminal specific gravity thereof was shown to be higher than that of the electrolyte of the present invention. As shown in FIG. 6, in the case of sulfuric-acid electrolyte (a) by undergoing a repetition of charge and discharge, it was shown that the capacity of discharge was rapidly reduced. However, in the case of electrolyte of the present invention (b), there was almost no change in capacity of discharge on account of a repetition of charge and discharge. It fact, by undergoing a repetition of charge and discharge, there was a small increase in capacity of discharge therein.

EXAMPLE 2

Figure 7:
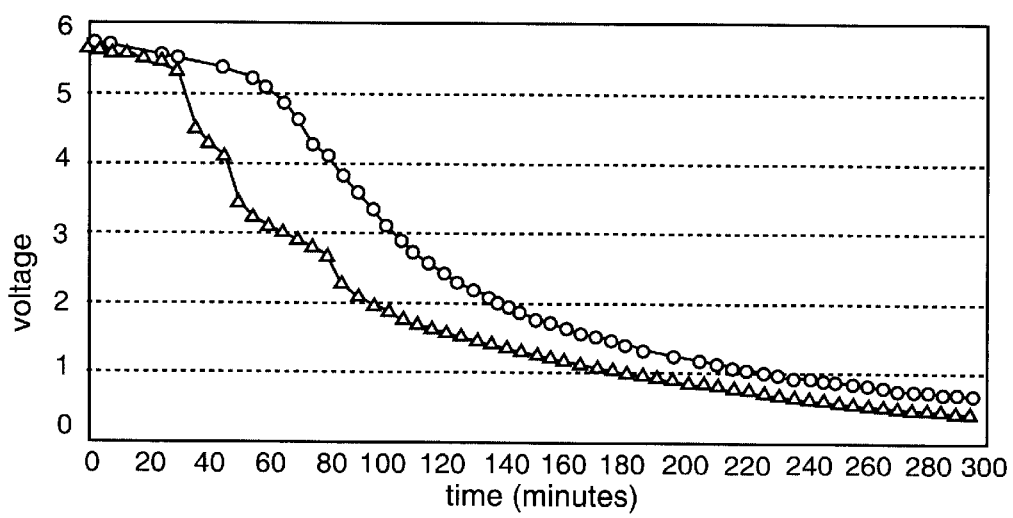
FIG. 7 is a graph, which illustrates the discharge voltage of electrolytes of the present invention and those of conventional sulfuric acid at a 6 V–10 W load.
Figure 8:
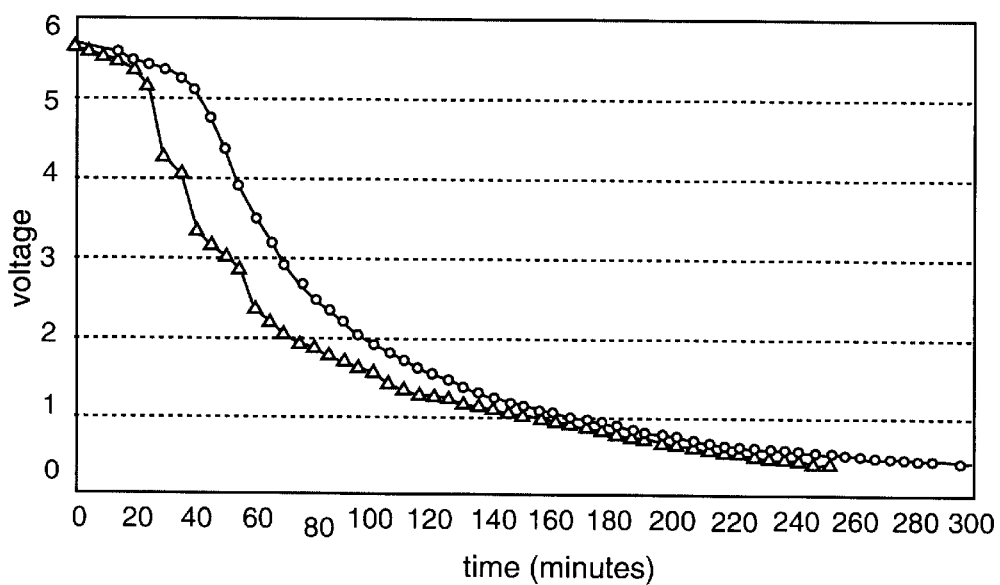
FIG. 8 is a graph, which illustrates the discharge voltage of electrolytes of the present invention and those of conventional sulfuric acid at a 6 V–15 W load.
Figure 9:
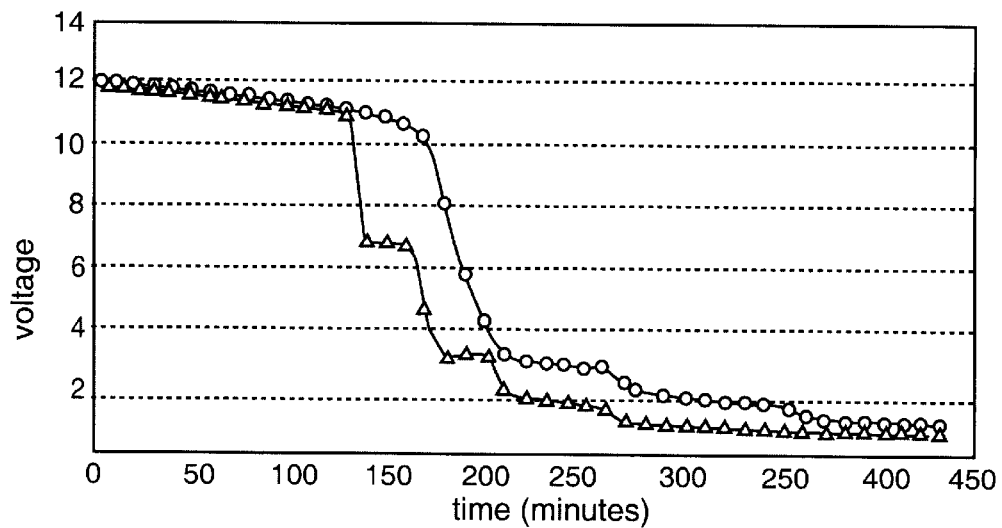
FIG. 9 is a graph, which illustrates the discharge voltage of electrolytes of the present invention and those of conventional sulfuric acid at a 12 V–100 W load.
Figure 10:
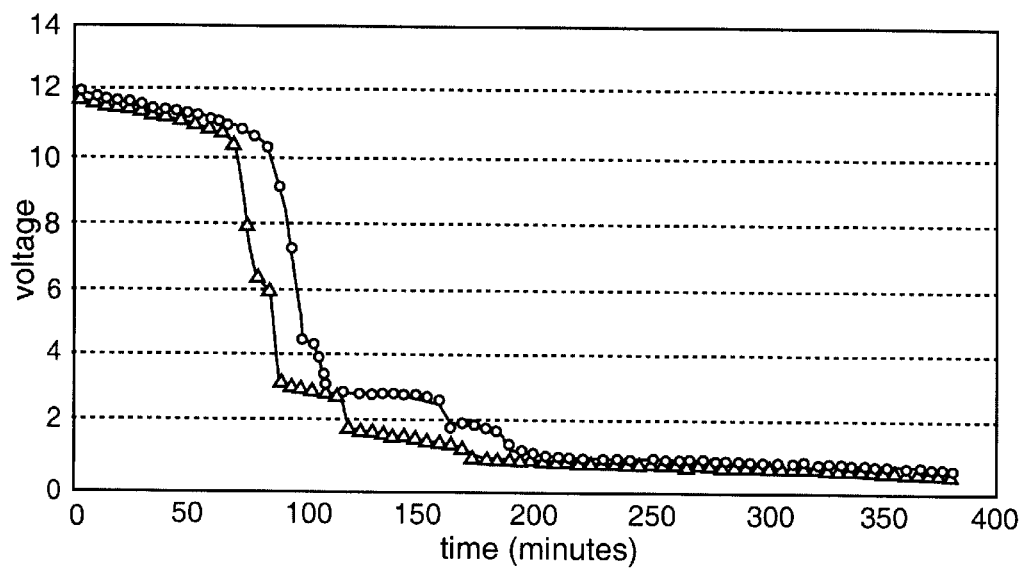
FIG. 10 is a graph, which illustrates the discharge voltage of electrolytes of the present invention and those of conventional sulfuric acid at a 12 V–150 W load.

The characteristics of discharge current were measured by using the electrolyte composition of the present invention and those of the conventional sulfuric acid. For measuring the discharge currents, the load circuit was made with 2 units of electric resistors 2.2 having the maximum rating of 10 W and 2 units of electric resistors 5 having the maximum rating of 10 W were used for a 6 V–10 W load (total resistance of 3.66 $\Omega$), or 3 units of electric resistors 2.2 having the maximum rating of 10 W, and with 3 units of electric resistors 5 having the maximum rating of 10 W were used for a 6 V–15 W load (total resistance of 2.46 $\Omega$). The results are shown in FIG. 7 (load of 6 V–10 W), FIG. 8 (load of 6 V–15 W), FIG. 9 (load of 12 V–100 W), FIG. 10 (load of 12 V–150 W), and Table 1.

TABLE 1

|  | 6V–10W | | 6V–15W | | 12V–100W | | 12V–150W | |
| --- | --- | --- | --- | --- | --- | --- | --- | --- |
|  | PI | $H_2SO_4$ | PI | $H_2SO_4$ | PI | $H_2SO_4$ | PI | $H_2SO_4$ |
| Initial Voltage (V) | 5.68 | 5.68 | 5.616 | 5.603 | 12.177 | 12.06 | 11.931 | 11.92 |
| Measured Voltage (V) | 5.14 | 5.35 | 5.094 | 5.181 | 10.200 | 10.894 | 10.203 | 10.344 |
| Consumption Time (minutes) | 60 | 30 | 40 | 20 | 170 | 130 | 85 | 70 |

PI: Present invention

As shown in FIGS. 7, 8, 9 and 10, the voltage curve of electrolyte of the present invention showed a gradual form at the time of a discharge. On the other hand, the sulfuric-acid electrolyte showed a characteristic of not being so gradual. Further, the time for a voltage drop took longer in the case of electrolyte of the present invention. As shown in Table 1 as above, the time duration until the occurrence of a voltage drop for the electrolyte of the present invention was much longer than that of the electrolyte of conventional sulfuric acid.

EXAMPLE 3

A comparison of characteristics was made with the conventional sulfuric acid by placing the electrolyte of the present invention into a storage battery (24 V–120 A), which had been used for more than 2 years. By using a fluctuating DC of 120 ampere as a rectifier, the following factors were measured: the stability of electrolytes, toxicity, corrosion, voltage according to the charge and discharge time, supplementation of distilled water, and the state of white-colored lead sulfate at the electrode plates. The results thereof are shown in Table 2.

TABLE 2

| Type | Conventional sulfuric-acid electrolyte | Electrolyte of the present invention |
|---|---|---|
| Stability | Harmful to human, needs care in handling | Non-toxic to human, ease in handling |
| Toxicity | Irritable smell | Non-irritant smell |
| Corrosion | Corrosion at terminals, wiring electrode plates, etc. | No corrosion |
| Effect of Charge | 2.00V~2.45V | 2.20V~2.65V~2.85V |
| Effect of Discharge | 2.00V~1.80V | 2.20V~1.80V |
| Supplement of Distilled Water | Necessary to supplement | Not necessary to supplement |
| White-colored Lead Sulfate | Occurrence of white-colored lead sulfate, adhering to the electrode plates | Disappearance of white-colored lead sulfate, even those adhering to the electrode plates. |

The electrolyte of the present invention offered ease in handling as compared to sulfuric-acid electrolyte. It was non-toxic to human without irritable smell. Moreover, there was no occurrence of white-colored lead sulfate at the terminals of a storage battery and wirings. Since it was not necessary to supplement with distilled water, the infiltration of impurities was thereby prevented.

The storage battery used in the present example was one that had been used for more than 2 years, with the occurrence of white-colored lead sulfate. This type of occurrence of lead sulfate was quite severe at all of the electrolyte plates, which lead to poor conversion to chemical energy. Consequently, these waste batteries showed reduction in performance as a storage battery, such as a dropout of electrodes, reduction of capacity of a storage battery, etc. Nonetheless, white-colored lead sulfate on the battery completely disappeared after 20 hours after pouring the electrolyte of the present invention therein.

EXAMPLE 4

To the storage batteries (320AH) with the same years in use, the electrolytes of the present invention were poured therein. In this manner, a comparison of performance was made with the storage batteries filled with sulfuric-acid electrolytes. As for the assessment for efficiency, the following factors were measured; the number of runs made by a battery locomotive for mining with the running distance of 1,500 m at a tunnel grade of 1/175, the discharge times for safety lamps for mining, etc. A silicon rectifier, a battery locomotive of 5 ton in size, and 4 V–12AH safety lamps for mining were used in the measurements herein. The results are shown in Tables 3 and 4.

TABLE 3

| | | | Amount of Work | | |
|---|---|---|---|---|---|
| Type | Amount of Discharge | Voltage | (2 ton) Entry of Empty Car (sum) | (2 ton) Withdrawal of New Car (sum) | Note |
| Conventional | (1 time) 130AH | 2.0V | 20 | 30 | |

TABLE 3-continued

| | | | Amount of Work | | |
|---|---|---|---|---|---|
| Type | Amount of Discharge | Voltage | (2 ton) Entry of Empty Car (sum) | (2 ton) Withdrawal of New Car (sum) | Note |
| Sulfuric acid Electrolyte | (2 times) 170AH | 1.4V | 30 | 40 | Inoperable |
| Electrolyte of Present Invention | (1 time) 250AH | 2.0V | 50 | 42 | |
| | (2 times) 250AH | 1.9V | 40 | 30 | |
| | (3 times) 250AH | 1.9V | 58 | 45 | Inoperable |

TABLE 4

| Type | Average Discharge Time | Notes |
|---|---|---|
| Conventional Sulfuric-acid Electrolyte | 9:08 | Waste |
| | 8:13 | Waste |
| | 9:20 | Waste |
| | 9:41 | Waste |
| Electrolyte of the Present Invention | 12:53 | Good |
| | 11:56 | Good |
| | 12:20 | Good |
| | 12:34 | Good |

As shown in Table 3 as above, in the case of a storage battery filled with the conventional sulfuric-acid electrolyte, 120 tons of coal in average was mined. In the case of a storage battery filled with the electrolyte of the present invention, 270 tons of coal in average was mined, which confirms the increase in efficiency of 2 times or more. Further, with 15% higher discharge efficiency, the electrolyte of the present invention had a faster recovery at the time of charge than the conventional sulfuric-acid electrolyte.

As shown in Table 4 as above, in the experiments for safe lamps, the electrolyte of the present invention had a 30% increase in capacity at the time of a discharge as compared to the conventional sulfuric-acid electrolyte, as for the conventional sulfuric-acid electrolyte, the useful life expired after 5 months of use in average, which in turn prevented continuous use during the operation in tunnel due to the reduction in discharge time. However, as for the electrolyte of the present invention, the continuous use was in fact made possible during the tunnel operation.

INDUSTRIAL APPLICABILITY

As shown above, the electrolyte of the present invention is able to maintain the performance of a storage battery at low temperature by means of enhancing the performance and life of a storage battery. It can also be fully charged in a short period of time due to a greater current efficiency. The present invention can also extend the life of a storage battery due to its effect of removing white-colored lead sulfate without corrosion at the electrode plates, which in turn may lead to recycling of waste storage batteries ruined by white-colored lead sulfate.

What is claimed is:

1. An electrolyte composition for a lead storage battery, which comprises 0.5~1.7 wt % of cobalt sulfate, 40~50 wt % of magnesium sulfate, 0.2~0.8 wt % of ammonium chloride, 15~25 wt % of aluminum chloride, and 0.05~1.0 wt % of nicotinic acid to 100 parts of distilled water.

\* \* \* \* \*